(12) United States Patent
Ripley et al.

(10) Patent No.: US 8,480,838 B2
(45) Date of Patent: Jul. 9, 2013

(54) LAMINATION APPARATUS AND METHODS

(75) Inventors: Scott Alan Ripley, River Falls, WI (US); Donald Ivan Hirsch, Cottage Grove, MN (US); William Frederic Bader, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/614,744

(22) Filed: Sep. 13, 2012

(65) Prior Publication Data

US 2013/0008595 A1    Jan. 10, 2013

Related U.S. Application Data

(62) Division of application No. 12/198,998, filed on Aug. 27, 2008, now Pat. No. 8,309,218, which is a division of application No. 10/115,523, filed on Apr. 3, 2002, now Pat. No. 7,432,009.

(51) Int. Cl.
*B29C 37/00* (2006.01)
*B32B 37/00* (2006.01)
*B32B 38/04* (2006.01)

(52) U.S. Cl.
USPC ............ 156/263; 156/265; 156/285; 156/303

(58) Field of Classification Search
USPC ................. 156/263, 264, 265, 269, 270, 285, 156/303, 302
See application file for complete search history.

(56) References Cited

U.S. PATENT DOCUMENTS

| 2,710,234 | A | 6/1955 | Hansen |
| 3,178,041 | A | 4/1965 | Wheat |
| 3,285,112 | A | 11/1966 | Dale |
| 3,291,282 | A | 12/1966 | Pedagno |

(Continued)

FOREIGN PATENT DOCUMENTS

| AT | 314323 | 3/1974 |
| DE | 1928110 | 12/1970 |

(Continued)

OTHER PUBLICATIONS

Ferris, "Design of Two Tone Ultrasonic Distance Measurement System", Applications of Electromagnetic Phenomena in Electrical and Mechanical Systems, The First Japanese-Australian Joint Seminar, Mar. 16-17, 2000, Adelaide, Australia, 8 pages.

(Continued)

*Primary Examiner* — Linda L Gray
(74) *Attorney, Agent, or Firm* — Gregory D. Allen

(57) ABSTRACT

Components for the manufacture of polymer electrolyte membrane fuel cells are provided, as well as apparatus and automatable methods for their manufacture by rotary die cutting and by lamination of various layers to form membrane electrode assemblies. A method and apparatus for performing the method are provided comprising die-cutting webs of catalyst decal materials or electrode materials to make first and second workpieces at first and second rotary die stations; holding the die-cut workpieces by action of sub-ambient air pressure to an endless perforated belt of first and second vacuum conveyors, typically before they are fully cut from the first and second webs; transporting first and second workpieces to opposing sides of a membrane in a laminating station; concurrently feeding the first and second workpieces into the laminating nip adjacent to the membrane, and laminating the first and second workpieces to the membrane.

3 Claims, 2 Drawing Sheets

U.S. PATENT DOCUMENTS

| | | |
|---|---|---|
| 3,359,046 A | 12/1967 | Dryden |
| 3,380,788 A | 4/1968 | Wilcock |
| 3,477,558 A | 11/1969 | Fleischauer |
| 3,539,177 A | 11/1970 | Schwenk |
| 3,785,638 A | 1/1974 | Beazley |
| 3,861,259 A | 1/1975 | Hitch |
| 3,946,920 A | 3/1976 | Jordan |
| 4,112,827 A | 9/1978 | Kang |
| 4,143,871 A | 3/1979 | Blessing |
| 4,168,772 A | 9/1979 | Eberle |
| 4,200,016 A | 4/1980 | Helmig |
| 4,236,814 A | 12/1980 | Tonkin |
| 4,286,467 A | 9/1981 | Köber |
| 4,360,260 A | 11/1982 | Eloranta |
| 4,362,380 A | 12/1982 | Dragstedt |
| 4,381,596 A | 5/1983 | Simonton |
| 4,428,793 A | 1/1984 | Sato |
| 4,534,549 A | 8/1985 | Eberle |
| 4,591,139 A | 5/1986 | Engelbart |
| 4,636,276 A | 1/1987 | Nozaka |
| 4,668,324 A | 5/1987 | Burns |
| 4,676,862 A | 6/1987 | Kuehnert |
| 4,720,227 A | 1/1988 | Eberle |
| 4,728,093 A | 3/1988 | Eberle |
| 4,784,380 A | 11/1988 | Eberle |
| 4,819,928 A | 4/1989 | Osborn |
| 4,887,858 A | 12/1989 | Gazzarrini |
| 5,031,002 A | 7/1991 | Yaguchi |
| 5,048,182 A | 9/1991 | Robbins, III |
| 5,061,337 A | 10/1991 | Fraser |
| 5,063,415 A | 11/1991 | Ariyama |
| 5,078,375 A | 1/1992 | Steidinger |
| 5,133,543 A | 7/1992 | Eitel |
| 5,140,872 A | 8/1992 | Holliday |
| 5,211,984 A | 5/1993 | Wilson |
| 5,256,030 A | 10/1993 | Tanaka |
| 5,334,431 A | 8/1994 | Longtin |
| 5,366,174 A | 11/1994 | Tsukamoto |
| 5,456,871 A | 10/1995 | Harada |
| 5,556,499 A | 9/1996 | Clough |
| 5,588,967 A | 12/1996 | Lemp |
| 5,596,897 A | 1/1997 | Payne, Jr. |
| 5,601,682 A | 2/1997 | Longtin |
| 5,761,793 A | 6/1998 | Bevers |
| 5,762,753 A | 6/1998 | Clough |
| 5,783,024 A | 7/1998 | Forkert |
| 5,788,796 A | 8/1998 | Look |
| 5,791,185 A | 8/1998 | Bodnar |
| 5,810,350 A | 9/1998 | Pollich |
| 5,899,341 A | 5/1999 | Irita |
| 5,910,378 A | 6/1999 | Debe |
| 5,989,386 A | 11/1999 | Elliott |
| 5,989,747 A | 11/1999 | Tanaka |
| 6,007,660 A | 12/1999 | Forkert |
| 6,042,959 A | 3/2000 | Debe |
| 6,059,003 A | 5/2000 | Wittkopf |
| 6,066,409 A | 5/2000 | Ronne |
| 6,159,327 A | 12/2000 | Forkert |
| 6,197,147 B1 | 3/2001 | Bönsel |
| 6,210,524 B1 | 4/2001 | Josephy |
| 6,224,203 B1 | 5/2001 | Wotton |
| 6,241,839 B1 | 6/2001 | Yoshino |
| RE37,366 E | 9/2001 | Cox |
| 6,347,585 B1 | 2/2002 | Kiamco |
| 6,405,779 B1 | 6/2002 | Wittkopf |
| 6,419,217 B1 | 7/2002 | Hartmann |
| 6,428,584 B1 * | 8/2002 | Debe et al. .................. 29/623.1 |
| 6,432,571 B1 | 8/2002 | Debe |
| 6,500,217 B1 | 12/2002 | Starz |
| 6,527,902 B1 * | 3/2003 | Rajala ........................ 156/263 |
| 6,533,154 B2 | 3/2003 | Kitai |
| 6,547,229 B1 | 4/2003 | Hanson |
| 6,585,846 B1 | 7/2003 | Hanson |
| 6,627,035 B2 | 9/2003 | Fan |
| 6,688,198 B2 | 2/2004 | Matsumoto |
| 6,720,103 B1 | 4/2004 | Nagai |
| 6,733,912 B2 | 5/2004 | Mlinar |
| 6,740,131 B2 | 5/2004 | Schukar |
| 6,742,561 B2 | 6/2004 | Nam |
| 6,749,713 B2 | 6/2004 | Mlinar |
| 6,756,146 B2 | 6/2004 | Mlinar |
| 6,780,276 B2 | 8/2004 | Ripley |
| 6,796,353 B2 | 9/2004 | Lang |
| 6,855,178 B2 | 2/2005 | Uchida |
| 6,868,890 B2 | 3/2005 | Hirsch |
| 6,967,038 B2 | 11/2005 | O'Brien |
| 6,974,647 B2 | 12/2005 | Wilkinson |
| 7,022,207 B2 | 4/2006 | Hirsch |
| 7,171,881 B2 | 2/2007 | Ripley |
| 7,195,690 B2 | 3/2007 | Mekala |
| 7,267,902 B2 | 9/2007 | Brunk |
| 7,432,009 B2 | 10/2008 | Ripley |
| 7,655,342 B2 | 2/2010 | Hahn |
| 8,309,218 B2 | 11/2012 | Ripley |
| 2002/0094470 A1 | 7/2002 | Wilkinson |
| 2002/0136940 A1 | 9/2002 | Mao |
| 2003/0145697 A1 | 8/2003 | Hixon |
| 2003/0188615 A1 | 10/2003 | Ripley |
| 2003/0188616 A1 | 10/2003 | Behymer |
| 2003/0190226 A1 | 10/2003 | Eaton |
| 2003/0221311 A1 | 12/2003 | Smith |
| 2004/0062977 A1 | 4/2004 | Yazici |
| 2005/0126407 A1 | 6/2005 | Hixon |
| 2009/0169950 A1 | 7/2009 | Prugh |

FOREIGN PATENT DOCUMENTS

| | | |
|---|---|---|
| DE | 2610628 | 9/1977 |
| DE | 3343811 | 6/1985 |
| DE | 4112379 | 10/1992 |
| DE | 9400890.6 U1 | 4/1994 |
| EP | 0654347 | 5/1995 |
| EP | 1304753 | 4/2003 |
| EP | 1473793 | 11/2004 |
| FR | 2456613 | 12/1980 |
| GB | 1084597 | 9/1967 |
| GB | 2101098 | 1/1983 |
| JP | 55-98040 | 7/1980 |
| JP | 57-093854 | 6/1982 |
| JP | 61-061367 | 3/1986 |
| JP | 62-244830 | 10/1987 |
| JP | 63-269458 | 11/1988 |
| JP | 3128851 | 5/1991 |
| JP | 06338342 | 12/1994 |
| JP | 07-156311 | 6/1995 |
| JP | 08273696 | 10/1996 |
| JP | 08-335462 | 12/1996 |
| JP | 10-166014 | 6/1998 |
| JP | 10-166294 | 6/1998 |
| JP | 11-254397 | 9/1999 |
| JP | 11-273663 | 10/1999 |
| JP | 11-292327 | 10/1999 |
| JP | 11-297314 | 10/1999 |
| JP | 2000-090944 | 3/2000 |
| JP | 2000-133248 | 5/2000 |
| JP | 2001-236971 | 8/2001 |
| JP | 2002-038361 | 2/2002 |
| NL | 6415053 | 6/1966 |
| WO | WO 97/23916 | 7/1997 |
| WO | WO 01/10701 | 2/2001 |
| WO | WO 01/11704 | 2/2001 |
| WO | WO 02/43171 | 5/2002 |
| WO | WO 02/43179 | 5/2002 |

OTHER PUBLICATIONS

Monkman, "Robot Grippers for Use With Fibrous Materials", The International Journal of Robotics Research, Apr. 1995, vol. 14, No. 2, pp. 144-151.

* cited by examiner

LAMINATION APPARATUS AND METHODS

CROSS REFERENCE TO RELATED APPLICATION

This application is a divisional of U.S. Ser. No. 12/198,998, filed Aug. 27, 2008, now U.S. Pat. No. 8,309,218 now allowed; which is a divisional of U.S. Ser. No. 10/115,523, filed Apr. 3, 2002, issued as U.S. Pat. No. 7,432,009, the disclosure of which is incorporated by reference in its entirety herein.

FIELD OF THE INVENTION

This invention relates to components for the manufacture of polymer electrolyte membrane fuel cells and apparatus and automatable methods for their manufacture by lamination of various layers to form membrane electrode assemblies.

BACKGROUND OF THE INVENTION

U.S. Pat. Nos. 6,159,327, 6,007,660 and 5,783,024 disclose an apparatus and method for making a plurality of substrates laminated on one or two sides with scissor-cut sheets of laminate.

SUMMARY OF THE INVENTION

Briefly, the present invention provides a method for making a membrane electrode assembly comprising the steps of providing a web of polymer electrolyte membrane material and a laminating station, where the web of polymer electrolyte membrane material is drawn between a pair of laminating rollers in the laminating station which form a laminating nip; die-cutting a first and second web of catalyst decal materials or electrode materials to make first and second workpieces at first and second rotary die stations; holding the die-cut workpieces by action of sub-ambient air pressure to an endless perforated belt of first and second vacuum conveyors, typically before they are fully cut from the first and second webs; transporting first and second workpieces to opposing sides of the membrane in the laminating station; concurrently feeding the first and second workpieces into the laminating nip adjacent to the membrane, typically before they are fully released by the first and second vacuum conveyors; and laminating the first and second workpieces to the membrane, advantageously in accurate registration.

In another aspect, the present invention provides an apparatus for making a membrane electrode assembly comprising a lamination station; a first and second vacuum conveyor; and a first and second rotary die station. These five components may be situated and geared together so that first and second workpieces emerging from first and second rotary die stations are held by action of sub-ambient air pressure to the endless perforated belt of first and second vacuum conveyors before they are fully cut from the first and second webs and are fed into the laminating nip adjacent to the membrane before they are released by the vacuum conveyors.

In another aspect, the present invention provides a membrane comprising a plurality of membrane electrode assemblies, which comprises a polymer electrolyte membrane having a first and second face; a plurality of first patterned catalyst layer segments or electrodes laminated on the first face of the membrane such that adjacent patterned catalyst layer segments are not in contact with each other; and a plurality of second patterned catalyst layer segments or electrodes laminated on the second face of the membrane such that adjacent patterned catalyst layer segments are not in contact with each other. Typically the first patterned catalyst layer segments or electrodes are in accurate registration with the second patterned catalyst layer segments or electrodes. Typically each of said first and second patterned catalyst layer segments or electrodes have a perimeter which is a shape other than a four-sided parallelogram. The first catalyst layer segments or electrodes may have a catalyst composition that differs from the catalyst composition of the second catalyst layer segments or electrodes.

In another aspect, the present invention provides a die-cut catalyst decal or electrode which has a perimeter which is a shape other than a four-sided parallelogram, typically made by a method of rotary die cutting.

In this application:

"to laminate" means to bond together two or more sheet materials; and

"membrane electrode assembly" means a construction comprising at least three layers, including a catalyst layer, a layer of a polymer electrolyte membrane, and another catalyst layer, and which may also comprise five layers, including a fluid transport layer, a catalyst layer, a layer of a polymer electrolyte membrane, another catalyst layer, and another fluid transport layer; and "fluid transport layers" may include layers previously termed "diffuser/current collector" (DCC) layers, "gas diffusion layers" (GDL), or "electrode backing layers" (EBL's).

It is an advantage of the present invention to provide methods, apparatus, and components for the manufacture of polymer electrolyte membrane fuel cells.

DETAILED DESCRIPTION OF PREFERRED EMBODIMENTS

Figure 1:
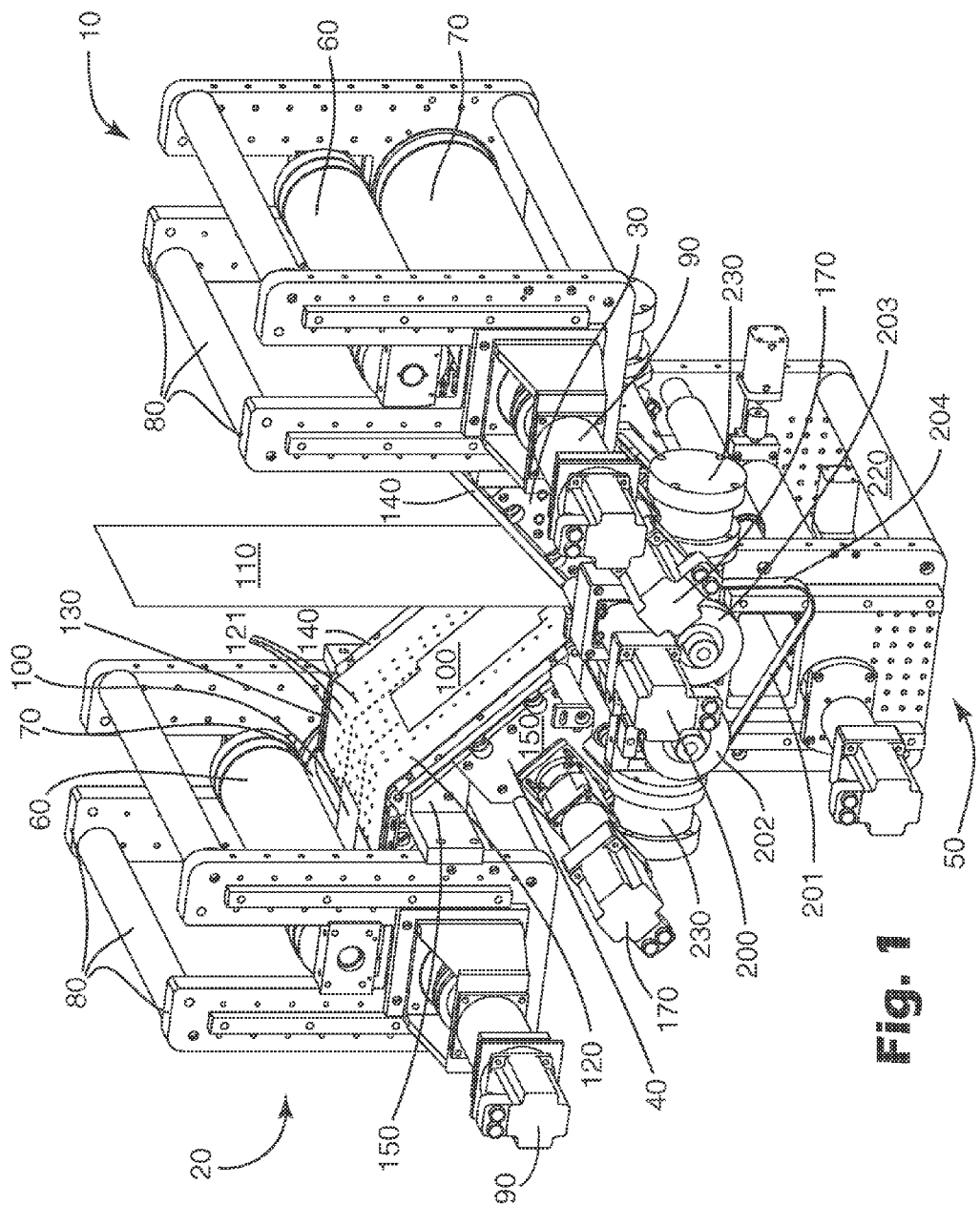
FIGS. 1 and 2 illustrate two views of an apparatus according to the present invention.
Figure 2:
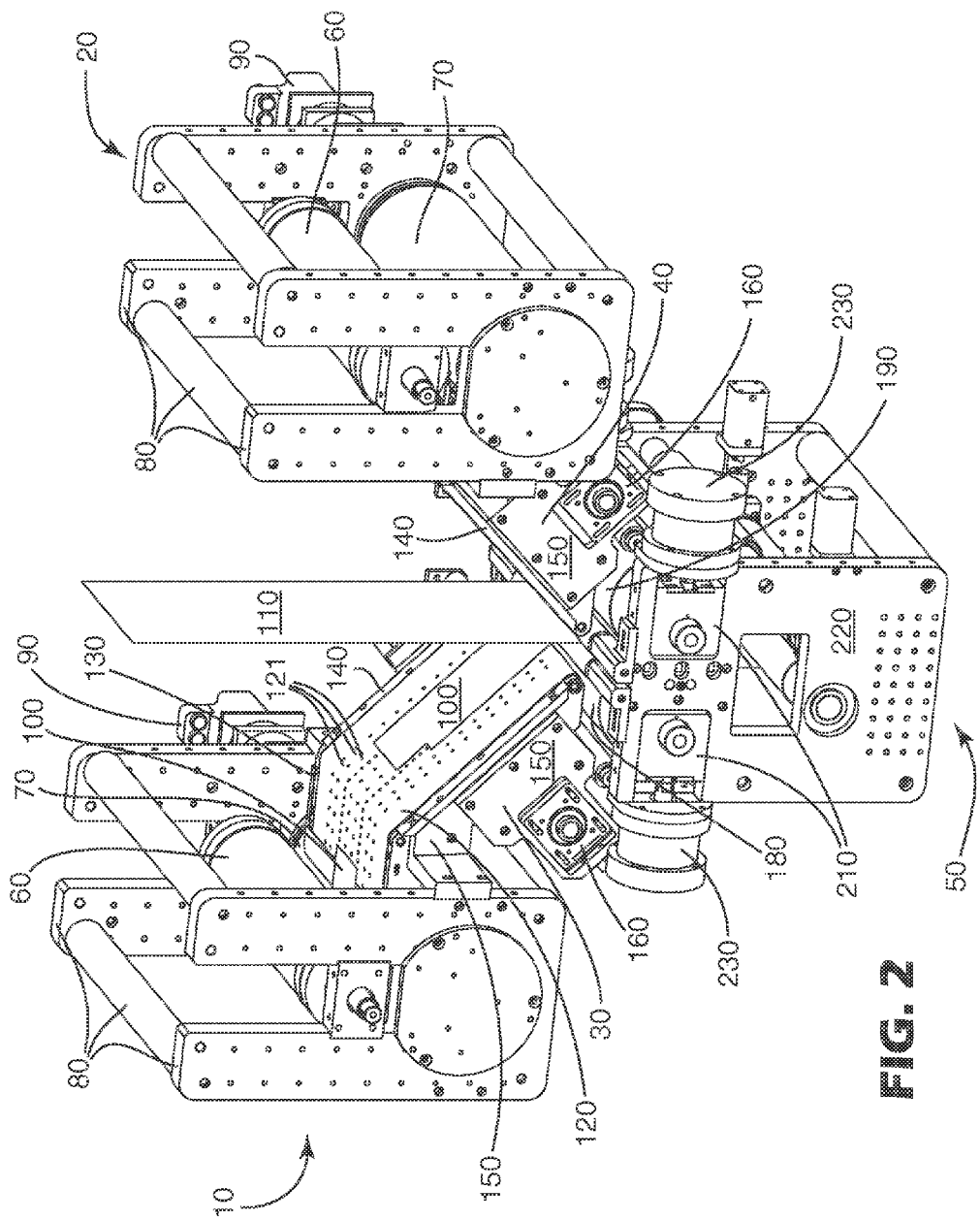

With reference to FIGS. 1 and 2, an apparatus according to the present invention comprises a pair of rotary die stations 10, 20, a pair of angled vacuum conveyors 30, 40, and a lamination station 50. Angled vacuum conveyors 30, 40 may be the vacuum conveyors described in co-pending U.S. patent application Ser. No. 10/116,323, titled "Angled Product Transfer Conveyor," filed on even date herewith (now abandoned), parent to Divisional U.S. patent application Ser. No. 11/136,822, filed on May 25, 2005, Issued as U.S. Pat. No. 7,171,881 on Feb. 6, 2007. Each combination of die station and angled vacuum conveyor, 10 with 30 and 20 with 40, may comprise the apparatus for cutting and transporting sheet materials described in co-pending U.S. patent application Ser. No. 10/116,323, titled "Angled Product Transfer Conveyor," filed on even date herewith (now abandoned), parent to Divisional U.S. patent application Ser. No. 11/136,822, filed on May 25, 2005, Issued as U.S. Pat. No. 7,171,881 on Feb. 6, 2007. Lamination station 50 may comprise the gapping block and other lamination apparatus described in co-pending U.S. patent application Ser. No. 10/115,777, titled "Gap Adjuster for Laminating Rolls," filed on even date herewith, Issued as U.S. Pat. No. 6,780,276, on Aug. 24, 2004.

Any suitable rotary die station may be used. Each rotary die station 10, 20 comprises a rotary die 60, anvil roll 70 rotatably attached to a frame comprising frame elements 80. One or both of rotary die 60 and anvil roll 70 are driven. Rotary die 60 and anvil roll 70 are typically geared together by electronic or mechanical gearing. In the apparatus as depicted, anvil roll 70 is driven by servo motor 90 and mechanically geared to rotary die 60. Any suitable combination of rotary die 60 and anvil roll 70 may be employed. Rotary die 60 typically comprises a cutting edge or edges (not apparent in FIGS. 1 and 2) wrapped around the outer portion of a roller having a suitable depth for the material to be cut. Unlike simple chopping or scissoring apparatus, which can produce workpieces having a shape selected from the set of four-sided parallelograms, rotary die 60 can produce cut workpieces 100 of arbitrary shape, including curved portions such as rounded corners, from a continuous web (not shown). Typical die-cut shapes have rounded corners, due to the limitations of die machining, and are therefore not four-sided parallelograms. The continuous web and cut workpieces 100 may be of any suitable material to be laminated to membrane 110.

In one embodiment according to the present invention, useful in the manufacture of membrane electrode assemblies for fuel cells, workpieces 100 are catalyst decals comprising a liner layer and a co-extensive catalyst layer which comprises particulate catalyst metal. Such workpieces are cut from a continuous web of the liner layer coated with the catalyst layer on at least a portion passing under the cutting portion of rotary die 60. Any suitable liner may be used, including any suitably flexible polymeric sheet materials having a thickness of typically less than 1 millimeter, more typically less than 0.5 millimeter, and more typically less than 0.2 millimeter. The catalyst layer may be applied by any suitable method, including bar coating, spray coating, slit coating, brush coating, and the like. The catalyst layer typically has a thickness of less than 1 millimeter, more typically less than 0.5 millimeter, and more typically less than 0.2 millimeter. Any suitable catalyst composition may be used. Typical catalyst compositions fine particles of platinum, palladium, ruthenium and other catalyst metals, or combinations of catalyst metals, supported on carbon particles. The carbon-supported catalyst particles are typically 50-60% carbon and 40-50% catalyst metal by weight, the catalyst metal typically comprising Pt for the cathode and Pt and Ru in a weight ratio of 2:1 for the anode. Typical catalyst compositions may also include polymer electrolyte materials such as sulfonated fluoropolymers, including Nafion™ or Flemion™. After the catalyst decal is laminated the liner is typically removed.

In another embodiment according to the present invention, also useful in the manufacture of membrane electrode assemblies for fuel cells, workpieces 100 are electrodes comprising a fluid transport layer and a co-extensive catalyst layer which comprises particulate catalyst metal. Such workpieces are cut from a continuous web of the fluid transport layer coated with the catalyst layer on at least a portion passing under the cutting portion of rotary die 60. Any suitable fluid transport layer may be used. Suitable fluid transport layers for fuel cell use are porous, to allow passage of fluids, and electrically conductive. Typical fluid transport layers include carbon fiber fabrics, mats, non-wovens and papers, such as Toray Carbon Paper (Toray Industries, Inc., Tokyo, Japan). The catalyst layer may be applied by any suitable method, including bar coating, spray coating, slit coating, brush coating, and the like. Any suitable catalyst composition may be used. Typical catalyst compositions fine particles of platinum, palladium, ruthenium and other catalyst metals, or combinations of catalyst metals, supported on carbon particles. The carbon-supported catalyst particles are typically 50-60% carbon and 40-50% catalyst metal by weight, the catalyst metal typically comprising Pt for the cathode and Pt and Ru in a weight ratio of 2:1 for the anode. Typical catalyst compositions may also include polymer electrolyte materials such as sulfonated fluoropolymers, including Nafion™ or Flemion™. Prior to coating with the catalyst dispersion, the gas diffusion layer has typically been coated with a hydrophobic layer such as Teflon™, typically by dipping in an aqueous suspension thereof, and then has typically been coated with a carbon black dispersion. The carbon black dispersion is typically an aqueous dispersion comprising carbon black and Teflon and optionally a surfactant such as TRITON X-100 (Union Carbide Corp., Danbury, Conn.). More typically, the dispersant is a combination of water and isopropyl alcohol, typically comprising more than 60% by weight isopropyl alcohol. The carbon black dispersion is typically coated onto the dried Toray paper at a wet thickness of 0.01 to 0.1 mm. The Teflon and carbon black coated fluid transport layer is typically dried in an oven at 380° C. for 10 minutes. This coated fluid transport layer is then further coated with the catalyst, typically in an amount yielding 0.2-5 mg of catalyst metal (Pt or Pt plus Ru) per square centimeter, typically about 0.5 mg of catalyst metal (Pt or Pt plus Ru) per square centimeter, to form a catalyst-coated fluid transport layer.

In embodiments according to the present invention useful in the manufacture of membrane electrode assemblies for fuel cells, membrane 110 is a polymer electrolyte membrane, such as a sulfonated fluoropolymer membrane, such as Nafion® (DuPont Chemicals, Wilmington Del.) and Flemion™ (Asahi Glass Co. Ltd., Tokyo, Japan). The polymer electrolytes useful in the present invention are typically copolymers of tetrafluoroethylene and one or more fluorinated, acid-functional comonomers, typically bearing sulfonate functional groups. Most typically the polymer electrolyte is Nafion®. The polymer electrolyte typically has an acid equivalent weight of 1200 or less, more typically 1100 or less, more typically 1050 or less, and most typically about 1000. The polymer electrolyte membrane may be cast, coated or otherwise formed from a suspension. Any suitable method of coating or casting may be used, including bar coating, spray coating, slit coating, brush coating, and the like. Membrane 110 is typically 100 micrometers in thickness or less, more typically 50 micrometers in thickness or less, and more typically 30 micrometers in thickness or less.

Any suitable vacuum conveyors may be used. Angled vacuum conveyors 30, 40 comprise endless perforated belts 120 perforated with belt holes 121. The belt may be made of any suitable material, including polymers, rubbers, fabrics, composites, and the like, provided that the outer surface is compatible with workpiece 110 to be transported on the belt. Endless perforated belt 120 passes over first vacuum plate 130 having longitudinal openings, not shown, and second vacuum plate 140 having longitudinal openings, not shown. Belt holes 121 are arranged in rows aligned with the longitudinal openings. Typically, each vacuum plate 130, 140 has at least two longitudinal openings aligned with at least two rows of belt holes 121. More typically, each vacuum plate 130, 140 has four or more longitudinal openings aligned with four or more rows of belt holes 121, so as to enable the vacuum conveyor to grip workpieces 100 of varying sizes across the majority of their width. In the embodiment as depicted, endless perforated belts 120 are driven in a direction toward the vacuum plate which angles downward for delivery of the workpiece 100 to laminating station 50.

Longitudinal openings in first and second vacuum plates 130, 140 communicate with first and second vacuum chambers (not shown), respectively. First and second vacuum chambers are maintained at first and second sub-ambient air pressures, such that the sub-ambient air pressures tend to hold workpiece 100 to endless perforated belt 120. First and second sub-ambient air pressures may be the same or different. Where first and second sub-ambient air pressures are different, the first sub-ambient air pressure is typically less than the second, enabling the conveyor to better hold workpieces 100 coming onto the conveyor at locations over first vacuum plate 130 and release workpieces leaving the conveyor from locations over second vacuum plate 140. The first and second vacuum chambers are maintained at first and second sub-ambient air pressures by any suitable means. The vacuum chambers may be functionally connected to one or more sources of sub-ambient air pressure such as vacuum pumps and the like.

First vacuum plate 130 is situated at a first angle relative to horizontal, which is approximately 0°. Second vacuum plate 140 is situated at second angle relative to horizontal, which is approximately −45°. Typically, the first and second angles are not equal. Typically, the first angle is between 30° and −30° relative to horizontal and said second angle is between −30° and −90° relative to horizontal. More typically, the first angle is between 5° and −5° relative to horizontal and said second angle is between −40° and −50° relative to horizontal. These angles allow angled vacuum conveyors 30, 40, to receive workpieces 100 from rotary die stations 10, 20, and deliver workpieces 100 downward into the laminating nip of lamination station 50.

First and second vacuum plates 130, 140 are mounted to a frame made up of one or more frame elements 150. Endless perforated belt 120 passes over a number of rollers rotatably mounted to frame elements 150. Endless perforated belt 120 also passes through drive mechanism 160 powered by servo motor 170.

In the place of vacuum conveyors, any positive grip conveyor may alternately be used. Positive grip conveyors may include known pick-and-place mechanisms, including those comprising armature mechanisms, known two-belt conveyors, which employ a pair of belts to form an extended nip to convey a workpiece, and known static electricity conveyors which hold a workpiece to a endless belt by the use of a static electric charge. Vacuum conveyors are advantageously used for handling delicate workpieces.

Lamination station 50 comprises first laminating roller 180 and second laminating roller 190. Either or both of first laminating roller 180 and second laminating roller 190 may be driven by known means such as motors and the like. Typically both are driven. Typically first laminating roller 180 and second laminating roller 190 are geared together so that they have the same speed at the gap. In one embodiment, first laminating roller 180 and second laminating roller 190 are driven by servo motor 200 which drives belt 201 and pulleys 202, 203. A belt tensioning system, not shown, maintains bend 204.

Typically first laminating roller 180 and second laminating roller 190 ride in bearings 210, which are of known types such as ball bearings, roller bearings, needle bearings, and the like. Bearings 210 are attached to the apparatus frame 220 such that pressure can be brought or maintained on bearings 210 which tends to bring together first and second laminating rollers 180, 190. The bearing housings may be fixedly attached to frame 220 or attached by means of pneumatic or hydraulic pistons and cylinders 230, as shown. Bearing mechanisms may form a part of drive mechanisms for either or both rollers.

First laminating roller 180 and second laminating roller 190 may be heated by any suitable method but are typically internally heated by a method such as electrical heating or circulation of hot air, water or oil.

Typically, a minimum laminating gap is maintained between first laminating roller 180 and second laminating roller 190. This minimum laminating gap is typically maintained by use of the gapping block described in co-pending U.S. patent application Ser. No. 10/115,777 (issued as U.S. Pat. No. 6,780,276), titled "Gap Adjuster for Laminating Rolls," filed on even date herewith. By maintaining a minimum gap in this manner, the apparatus according to the present invention may be used for intermittent lamination, i.e., where one or more of the layers to be laminated is not continuously present in the laminating gap during lamination. In that case, the product may be a continuous web with non-continuous patches of additional sheet materials laminated thereto. In the case of intermittent lamination, the continuous web could be crushed or damaged if the full laminating pressure were applied when the non-continuous sheet material was not present in the gap.

Typically, webs of laminating cover liner are introduced on either side of the laminating nip during lamination, so that first laminating roller 180 and second laminating roller 190 are covered by a first laminating cover liner and a second laminating cover liner, respectively, during lamination. The use of laminating cover liners may enable higher temperature lamination. After lamination, first and second laminating cover liners are removed from the laminate and rewound. Any suitable material may be used for first and second laminating cover liners, so long as the material will not become laminated under the laminating conditions and will not impart any undesirable texture to the laminate.

Angled vacuum conveyors 30, 40 and rotary die stations 10, 20 are advantageously arranged such that an emerging portion of a workpiece 100 being cut from a web of workpiece material can become held by the action of the first sub-ambient pressure in the first vacuum chamber, drawing air through first vacuum plate 130 and endless perforated belt 120, before workpiece 100 is fully separated from the web of workpiece material. Angled vacuum conveyors 30, 40 and laminating station 50 are advantageously arranged such that a leading edge of a workpiece 100 being transported by an angled vacuum conveyor 30, 40 is drawn into the laminating nip of lamination station 50 before it is fully released by the angled vacuum conveyor 30, 40. Most advantageously, both arrangements are made, so that workpiece 100 is held by angled vacuum conveyors 30, 40 before workpiece 100 is fully separated from the web of workpiece material and workpiece 100 is drawn into the laminating nip of lamination station 50 before it is fully released by the angled vacuum conveyor 30, 40. In this way, positive control of workpiece location is maintained through every step. As a result, membrane 110 may be laminated on both sides with accurate registration. Accurate registration typically means that the perimeters of the pattern-cut sheet materials match to within 2 mm, more typically 1 mm, more typically 0.5 mm, more typically 250 µm, and more typically 125 µm.

Drive mechanisms for rotary die stations 10, 20, angled vacuum conveyors 30, 40, and lamination station 50 are advantageously geared or synchronized together, by mechanical or more typically by electronic gearing. The drive mechanism for propelling endless perforated belt 120 may be geared with the drive mechanism driving rotary die 60 such that the linear surface velocity of endless perforated belt 120 may be equal to or greater than the linear surface velocity of rotary die 60. A greater velocity enables the conveyor to space apart workpieces 100 as they emerge from rotary die 60, so that workpieces 100 may be cut with no intervening scrap but placed with intervening margins. The drive mechanism for propelling endless perforated belt 120 may be geared with the drive mechanism driving first and second laminating rollers 180, 190 such that the linear surface velocity of first and second laminating rollers 180, 190 may be equal to or greater than the linear surface velocity of endless perforated belt 120.

In the method according to the present invention, a membrane 110 such as a web of polymer electrolyte membrane material is drawn between laminating rollers 180, 190 in laminating station 50 which form a laminating nip. A first and second web of laminate material is die-cut at rotary die stations 10, 20 to form cut workpieces 100. The first and second webs of laminate material may be the same or different. The first and second webs of laminate material may be catalyst decal materials comprising a liner layer and a first catalyst layer, or electrode material comprising a fluid transport layer and a first catalyst layer. The cut workpieces 100 are transported to laminating station 50 by vacuum conveyors 30 and 40 and concurrently fed into the laminating nip between laminating rollers 180 and 190 on either side of membrane 110 to form a laminate. Advantageously, workpieces 100 come to be held by action of sub-ambient air pressure to vacuum conveyors 30 and 40 before they are completely separated from first or second webs of laminate material. Advantageously workpieces 100 are gripped by the laminating nip between laminating rollers 180 and 190 before they are released from vacuum conveyors 30 and 40.

The lamination may be repeated to form a continuous web of membrane linking similar laminates.

Where membrane 110 is a polymer electrolyte membrane, as described above, and workpieces 100 are catalyst decals, as described above, the method and apparatus according to the present invention may be used to produce a continuous membrane that comprises a plurality of membrane electrode assemblies, all comprising first and second patterned catalyst layer segments which are in accurate registration. The first and second patterned catalyst layer segments can have a perimeter which is a shape other than a four-sided parallelogram. Typical die-cut shapes have rounded corners, and may additionally form any of a large number of arbitrary perimeter shapes. The first and second patterned catalyst layer segments can have the same or different catalyst composition.

Where membrane 110 is a polymer electrolyte membrane, as described above, and workpieces 100 are electrodes comprising a fluid transport layer and a co-extensive catalyst layer catalyst decals, as described above, the method and apparatus according to the present invention may be used to produce a continuous membrane that comprises a plurality of membrane electrode assemblies, all comprising first and second patterned electrode segments which are in accurate registration. The first and second patterned electrode segments can have a perimeter which is a shape other than a four-sided parallelogram. Typical die-cut shapes have rounded corners, and may additionally form any of a large number of arbitrary perimeter shapes. The first and second patterned electrode segments can have the same or different catalyst composition.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A method of making a membrane electrode assembly comprising the steps of:
   a) providing a web of polymer electrolyte membrane material;
   b) providing a laminating station wherein said web of polymer electrolyte membrane material is drawn between a pair of laminating rollers which form a laminating nip;
   c) die-cutting a first web of first catalyst decal material, said web comprising a removable liner layer and a first catalyst layer, to make a first catalyst decal;
   d) die-cutting a second web of second catalyst decal material, said web comprising a removable liner layer and a second catalyst layer, to make a second catalyst decal;
   e) transporting said first catalyst decal to said laminating station;
   f) transporting said second catalyst decal to said laminating station;
   g) feeding said first catalyst decal into said laminating nip adjacent to said web of polymer electrolyte membrane material;
   h) feeding said second catalyst decal into said laminating nip adjacent to said web of polymer electrolyte membrane material concurrently with said first catalyst decal;
   i) laminating said first catalyst decal, said web of polymer electrolyte membrane material and said second catalyst decal to form a laminate.

2. The method according to claim 1 additionally comprising the steps of:
   j) holding said first catalyst decal by action of sub-ambient air pressure to an endless perforated belt of a vacuum conveyor before step c) is complete; and
   k) beginning step g) before releasing said first catalyst decal from said endless perforated belt of said vacuum conveyor.

3. The method according to claim 2 additionally comprising the steps of:
   l) holding said second catalyst decal by action of sub-ambient air pressure to an endless perforated belt of a vacuum conveyor before step d) is complete; and
   m) beginning step h) before releasing said second catalyst decal from said endless perforated belt of said vacuum conveyor.

* * * * *